US008943261B2

(12) United States Patent
Koradhanyamath et al.

(10) Patent No.: US 8,943,261 B2
(45) Date of Patent: Jan. 27, 2015

(54) EFFICIENT MEMORY MANAGEMENT IN SOFTWARE CACHES

(75) Inventors: Avinash Koradhanyamath, Raleigh, NC (US); Shirish T. S. Kuncolienkar, Bangalore (IN); Ajith Ramanath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 13/284,153

(22) Filed: Oct. 28, 2011

(65) Prior Publication Data

US 2013/0111144 A1  May 2, 2013

(51) Int. Cl.
*G06F 12/00* (2006.01)
*G06F 12/02* (2006.01)
*G06F 12/08* (2006.01)

(52) U.S. Cl.
CPC ........ *G06F 12/0253* (2013.10); *G06F 12/0802* (2013.01)
USPC ............ 711/103; 711/113; 711/133; 711/134

(58) Field of Classification Search
CPC ............ G06F 12/0246; G06F 12/0866; G06F 12/127; G06F 12/121
See application file for complete search history.

(56) References Cited

U.S. PATENT DOCUMENTS

| 6,321,240 B1 | 11/2001 | Chilimbi et al. |
| 6,865,657 B1 | 3/2005 | Traversat et al. |
| 6,973,536 B1 | 12/2005 | Jacobs et al. |
| 2002/0073283 A1* | 6/2002 | Lewis et al. .................. 711/133 |
| 2006/0248276 A1* | 11/2006 | Kilian et al. .................. 711/130 |
| 2009/0157974 A1 | 6/2009 | Lasser |
| 2009/0327374 A1 | 12/2009 | Wright et al. |
| 2010/0223429 A1 | 9/2010 | Cher et al. |
| 2010/0241808 A1 | 9/2010 | Toub et al. |

OTHER PUBLICATIONS

K.D. Nilsen et al. "A High-Performance Hardware-Assisted Real-Time Garbage Collection System" (Abstract) Journal of Programming Languages, vol. 2, No. 1, pp. 1-40, Dec. 1994.

* cited by examiner

*Primary Examiner* — Baboucarr Faal
(74) *Attorney, Agent, or Firm* — A. Bruce Clay (57) ABSTRACT

The use of heap memory is optimized by extending a cache implementation with a CacheInterface base class. An instance of a ReferenceToCache is attached to the CacheInterface base class. The cache implementation is registered to a garbage collector application. The registration is stored as a reference list in a memory. In response to an unsatisfied cache allocation request, a garbage collection cycle is triggered to check heap occupancy. In response to exceeding a threshold value, the reference list is traversed for caches to be cleaned based upon a defined space constraint value. The caches are cleaned in accordance with the defined space constraint value.

17 Claims, 3 Drawing Sheets

EFFICIENT MEMORY MANAGEMENT IN SOFTWARE CACHES

BACKGROUND

The present invention relates, in general, to memory management, and, in particular, to management of memory in a cache.

A cache is a component that improves hardware and software performance by transparently storing data such that future requests for that data can be served faster. The data in the cache is often either stored elsewhere or would have been computed earlier. A cache is used when the original data is more expensive to fetch (owing to longer access time) or to compute, than the cost of storing it for immediate reading when needed.

BRIEF SUMMARY

According to one embodiment of the present invention, the use of heap memory is optimized by extending a cache implementation with a base class. An instance of a utility class is attached to the base class. The cache implementation is registered to a garbage collector routine. The registration is stored as a reference list in a memory. In response to an unsatisfied cache allocation request, a garbage collection cycle is triggered to check heap occupancy. In response to exceeding a first threshold value, the reference list is traversed for caches to be cleaned based upon a defined space constraint value. The caches are cleaned in accordance with the defined space constraint value.

According to one embodiment of the present invention, a system optimizes use of heap memory. The system comprises a processor and memory connected to the processor, wherein the memory is encoded with instructions and wherein the instructions when executed extend a cache implementation with a base class. The instructions further comprise instructions for attaching an instance of a utility to the base class. The instructions register the cache implementation to a garbage collector routine. The instructions store the registration as a reference list. Responsive to an unsatisfied cache allocation request, the instructions further trigger a garbage collection cycle to check heap occupancy. Responsive to exceeding a first threshold value, the instructions further traverse the reference list for caches to be cleaned based upon a defined space constraint value. The caches are cleaned in accordance with the defined space constraint value.

According to one embodiment of the present invention, a computer program product optimizes use of heap memory. The computer program product comprises a computer readable storage medium having computer readable program code embodied therewith. The computer readable program code is configured to extend a cache implementation with a base class. The computer readable program code attaches an instance of a utility class to the base class. The computer readable program code registers the cache implementation to a garbage collector routine, and stores the registration as a reference list. In response to an unsatisfied cache allocation request, computer readable program code triggers a garbage collection cycle to check heap occupancy. In response to exceeding a first threshold value, computer readable program code traverses the reference list for caches to be cleaned based upon a defined space constraint value. The caches are cleaned in accordance with the defined space constraint value.

BRIEF DESCRIPTION OF THE SEVERAL VIEWS OF THE DRAWINGS

FIG. 1 is an illustration of an example of hardware upon which one embodiment of the present invention may be utilized;

FIG. 2 is a flowchart illustrating one embodiment of the present invention through run-time; and FIG. 3 is a flowchart illustrating one embodiment of the present invention through a complete cycle.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
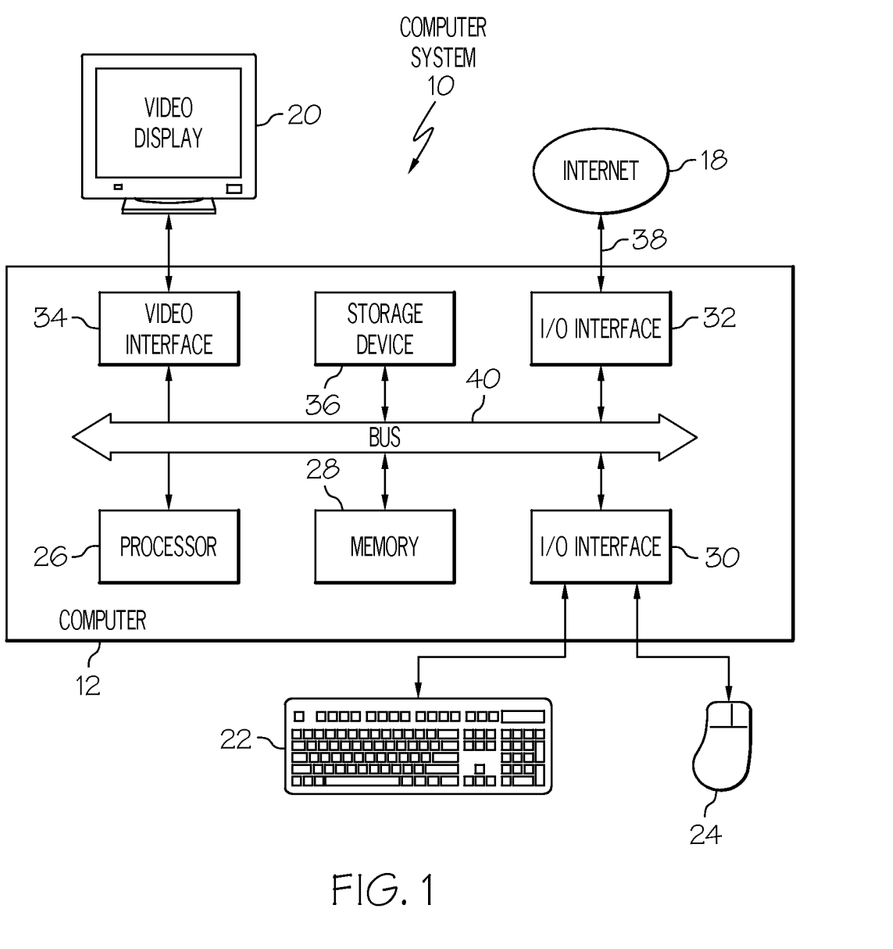

FIG. 1 is one example of a computer system 10 suitable for executing computer software for efficiently managing software cache memory. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

The present invention provides improvements over the prior art. One embodiment of the present invention comprises a framework that provides underlying virtualized run-times, such as Java, having an automatic garbage memory collection facility, with the ability to coordinate with cache implementations such that optimal performance of the application is achieved with the least memory overhead and maximum processor utilization. This framework introduces two classes, a base class named CacheInterface and an instance of a utility class named ReferenceToCache. It is to be understood that the names given these two classes are arbitrary and used, herein, for convenience of description only. The classes could be given any other name, as desired.

The CacheInterface class is an abstract base class which the cache implementations must extend to use certain base attributes and functions. This class provides API functions which the garbage collector (GC) can use to communicate with an object of this class in order to better manage memory and CPU consumption by the application. The extending class should consider:

1. Inheriting classes must implement all the abstract methods defined in the class;
2. Inheriting classes are free to decide on the data structure to be used for storing the cached entries;
3. Any synchronization for data integrity will have to be done by the Inheriting class; and
4. The task of creating a cache entry when one does not exist will be automatically delegated to the Inheriting class.

Class Definition:

```
public abstract class CacheInterface {
  ReferenceToCache ref;
    public static final int SPACE_CONSTRAINT_MILD = 0;
    public static final int SPACE_CONSTRAINT_MEDIUM = 1;
    public static final int SPACE_CONSTRAINT_SEVERE = 2;
```

-continued

```
    public static final int SPACE_CONSTRAINT_CRITICAL = 3;[1]
    public CacheInterface( ) {
        ref = ReferenceToCache.exportCacheObject (this);[2]
    }
    public final Object get(Object key) {
        long startTime = System.currentTimeMillis ( );[3]
        Object cachedValue = getEntry(key);
        long endTime = System.currentTimeMillis ( );[4]
        if (cachedValue == null) {
            startTime = System.currentTimeMillis ( );
            cachedValue = createEntry(key);
            putEntry(key, cachedValue);
            endTime = System.currentTimeMillis ( );
            ref.addCreateCost(endTime-startTime);[5]
        } else {
            ref.addGetCost(endTime-startTime);[6]
        }
        return cachedValue;
    }
    protected abstract Object getEntry(Object key);
    protected abstract void putEntry(Object key, Object value);
    protected abstract Object createEntry(Object key);
    protected abstract void cleanup(int spaceConstraint, long spaceRequirement);
    protected abstract void clear( );[7]
}
```

[1]CONSTRAINT - helps determine the severity of the memory "pressure."
[2]The ReferenceToCache constructor is where an export happens which is needed to "associate" a newly created cache object and GC.
[3]Start time.
[4]End time.
[5]Subtract end time and start time to obtain the total time spent "adding"/creating a value to a cache.
[6]Similar to "adding" cost computation, but, here, "get" cost is computed for "getting" a value from a cache.
[7]Abstract methods that child classes of each abstract class must implement.

Method Description:

Table 1.1 describes the methods defined in the CacheInterface class.

TABLE 1.1

| Method Name | Description | Parameters | Return Value |
|---|---|---|---|
| getEntry | This method will be called to find a cached object. It should search the underlying store, find the cached entry and return the same. If no entry is found null should be returned. | key—the key with which the cache object has been stored | The cached entry or null |
| putEntry | This method will be called to insert newly created cache entries. This method should insert the given key-value pair in the underlying store. | key—The key with which the value is inserted into the cache value—The value that should be cached. | void |
| createEntry | This method will be called when no entry is found for a given key. This method should create the object to be cached for the given key. | key—The key with which the value should be created | The newly created object |
| cleanup | This method should have the logic to clear the most unwanted cache entries | spaceConstraint—value used to convey the acuteness of the memory pressure (i.e., need for more memory) on the runtime/application at that point in time to the cache implementation spaceRequirement—used to convey the amount of memory in bytes that should be freed up in order to meet the current memory demand. This value is used by the cache implementations to compute that number of cache entries that should be cleaned up to achieve the space requirement. | void |

TABLE 1.1-continued

| Method Name | Description | Parameters | Return Value |
| --- | --- | --- | --- |
| clear | This method will be called when caching a particular entity is ineffective. When this method is called, all the entries from the underlying cache should be removed. | void | void |
| get | This is the only public method which can be called by the code using the cache. This method returns the cached copy of an object for a given key. If the cached copy is not found internally, the createEntry method is called to create and store the cache entry. | key—Key for which the cached obtained | Cached copy of the object for the give key |

The public method "get( )" defined in the abstract base class, CacheInterface, is declared as "final." This prevents other classes that extend from this abstract class from overriding this method implementation. The implementation of this method first computes the total time taken to complete the "getEntry( )" operation. This is done by looking up the system clock before and after invocation of this method. Further, if the value for the given key is absent inside the cache, the method implementation will create and put a new value associated with the key in question into the cache. As part of this operation, the implementation computes the time taken to create and put a new value into the cache. The time taken to add a new value into the cache is also computed by looking up the system clock before creating the new value and after putting the created value into the cache. See pseudo-code implementation of the method in Class Definition, above, for more details.

Field Description: Table 1.2 describes all the fields in the CacheInterface class.

ReferenceToCache Class:

Whenever a CacheInterface object is created, an instance of a utility class (as used herein, ReferenceToCache) is attached to this object. ReferenceToCache provides a way for cache implementations to register the cache with the GC component in the JVM and also provides functions to compute the various costs associated with the different cache operations, as will be discussed in greater detail below. The object is instantiated by making a call into the GC routine. The same object is added to a list of objects maintained by the GC. All the cache statistics are stored in this object and the GC has ready access to the cache and its statistics. The GC, based on its requirements at run-time, can request the caches, via this object, to free up memory held by them.

TABLE 1.2

| Field Name | Field Class | Details |
| --- | --- | --- |
| ref | ReferenceToCache | A new class introduced as an interface between the cache and the garbage collector. Each time a CacheInterface object is instantiated, a call is made to a GC API to create an object of this kind. This will be discussed in greater detail below. |
| SPACE_CONSTRAINT_MILD | long | This field is used as a flag to be passed to the cleanup method. This represents a condition where heap space requirement is mild in nature. |
| SPACE_CONSTRAINT_MEDIUM | long | This field is used as a flag to be passed to the cleanup method. This represents a condition where heap space requirement is medium in nature. |
| SPACE_CONSTRAINT_SEVERE | long | This field is used as a flag to be passed to the cleanup method. This represents a condition where heap space requirement is severe in nature. |
| SPACE_CONSTRAINT_CRITICAL | long | This field is used as a flag to be passed to the cleanup method. This represents a condition where heap space requirement is critical in nature. |

Class Definition:

```
public class ReferenceToCache {
    CacheInterface theCache;
    long getCost;
    long createCost;
    long gets;
    long creates;
    static final ReferenceToCache exportCacheObject(
        CacheInterface cache) {
        ReferenceToCache ref = getReferenceForCache (cache);
        ref.theCache = cache;
        return ref;
    }
    static native ReferenceToCache getReferenceForCache (
        CacheInterface cache); [8]
    void addCreateCost(long startTime, long endTime){
        creates++;
        createCost += (endTime-startTime);
        lastWrite = endTime; [9]
    }
    void addGetCost(long startTime, long endTime){
        gets++;
        getCost += (endTime-startTime);
        lastRead = endTime; [10]
    }
    double getVSCreateCostRatio( ) {
        return
        (gets*(getCost/gets))/(creates*(createCost/creates)); [11]
```

```
    }
    double readVSwriteRatio( ) {
        return (gets)/(writes); [12]
    }
    long lastRead( ) {
        return lastRead; [13]
    }
    long lastWritten( ) {
        return lastWrite; [13]
    }
    long readCount( ) {
        return this.gets; [13]
    }
    long writeCount( ) {
        return this.writes; [13]
    }
}
```

[8] Gets and stores the cache reference. Returns reference to the ReferenceToCache class.
[9] Method to compute and store "create" cost.
[10] Method to compute and store "get" cost.
[11] Ratio of time taken to get( ) a value from cache and create a new value in the cache.
[12] Ratio of frequency of get( )s and updates (create + add) into the cache.
[13] Methods that provide information about the cache effectiveness.

Method Description

Table 1.3 describes all the methods defined in the ReferenceToCache class.

TABLE 1.3

| Method Name | Description | Parameters | Return Value |
| --- | --- | --- | --- |
| exportCacheObject | This method is called whenever an object of CacheInterface class is instantiated. This method is used to register a cache with the GC so that the GC is aware of its existence and can communicate therewith. | cache—the cache to collector. | The newly created ReferenceToCache object which acts as an interface between the cache and Garbage collector |
| addCreateCost | This method is called whenever a new cache entry is created. The time taken to create the entry is registered for statistical purposes. | startTime—Time when was initiated endTime—Time when | void |
| addGetCost | This method is called whenever a cache entry is retrieved from the underlying store. The time taken to retrieve the entry is registered for statistical purposes. | startTime—Time when started. endTime—Time when retrieved. | void |
| getVSCreateCostRatio | This method returns a ratio of (cost of getting an object from the cache)/(cost of creating the object when required) Ratio greater than 1 suggests that the cache is ineffective and should no longer be used. The effectiveness of the cache increases as the value of this ratio approaches 0. | void | cost ratio of get v/s create |
| readVSwriteRatio | This method returns a ratio of (Number of reads)/(number of writes) Ratio closer or | void | ratio of number of reads v/s number of writes |

TABLE 1.3-continued

| Method Name | Description | Parameters | Return Value |
|---|---|---|---|
| | greater than 1 suggests that every cache entry is used only once, such caches are again ineffective and should no longer be used. The higher the ratio the more effective the cache. | | |
| lastRead | This method returns the time when the cache was last read | void | time when the last value was retrieved from the cache. |
| lastWritten | This method returns the time when the cache was last populated with a new entry | void | time when the last value was added to the cache. |

Field Description: Table 1.4 describes all the fields in the ReferenceToCache class.

TABLE 1.4

| Field Name | Field Class | Description |
|---|---|---|
| theCache | CacheInterface | Cache object connected to the reference |
| getCost | long | Stores the total time taken for all the gets from the cache |
| createCost | long | Stores the total time taken for all the creates from the cache |
| gets | long | Number of times an entry was read from the cache |
| writes | long | Number of times entry was created and added to the cache. |
| lastRead | long | Last time when the cache was read |
| lastWrite | long | Last time when the cache was written to |

Example implementation of a cache.

The following pseudo code demonstrates a sample Socket connection cache:

```
public class ConnectionCache extends CacheInterface {
        HashMap<ConnectionKey, Socket> map = new HashMap<ConnectionKey, Socket>( );
            public ConnectionCache( ) {
                super( );
            }
@Override
protected void cleanup(int spaceConstraint, long spaceRequirement) {
        int size = map.size( );
        int entriesToRemove = 0 ; (14)
        switch (spaceConstraint) {
        case CacheInterface.SPACE_CONSRAINT_MILD :
                entriesToRemove = (int)(size*.05); //clear 5% (15)
                break;
        case CacheInterface.SPACE_CONSRAINT_MEDIUM :
                entriesToRemove = (int)(size*.10); //clear 10% (15)
                break;
        case CacheInterface.SPACE_CONSRAINT_SEVERE :
                entriesToRemove = (int)(size*.20); //clear 20% (15)
                break;
        case CacheInterface.SPACE_CONSRAINT_CRITICAL :
                entriesToRemove = (int)(size*0.40); //clear 40% (15)
                break;
        default:
                break;
        }
        /*
        * Use the 'entriesToRemove' variable as a guidance value *
        locate the most stale connections and clear them
        */
}
@Override
public void clear( ) {
        //For each entry in the map close the socket
        map.clear( );
}
@Override
public Object createEntry(Object key) {
        ConnectionKey cKey = (ConnectionKey)key;
        try {
                Socket s = new Socket(cKey.host, cKey.port);
                return s;
        } catch (UnknownHostException e) {
                // handle exception
        } catch (IOException e) {
                // handle exception
        }
        return null;
}
@Override
public Object getEntry(Object key) {
        return map.get(key);
}
@Override
public void putEntry(Object key, Object value) {
        map.put((ConnectionKey)key, (Socket)value);
}
public static void main(String[ ] args) {
        CacheInterface myCacheInterface = new ConnectionCache( );
                myCacheInterface.get("myhost:9000");
        }
}
```

(14)A local variable. This is then 'set' to a value based on spaceConstraint argument received from caller (GC in this case)..
(15)GC tells how great the memory pressure is. That is conveyed via "spaceConstraint" argument to cleanup( ) method. However, the number of entries to remove is cache implementation specific. The cache implementer can determine how important the cached entries are for performance of the application and then come up with the percentage of entries to be removed.

The percentages listed above are suggestive in nature. The implementation of a cache called ConnectionCache whose implementer decided 40% of the cache can be removed when memory pressure is too much (critical).

Figure 2:
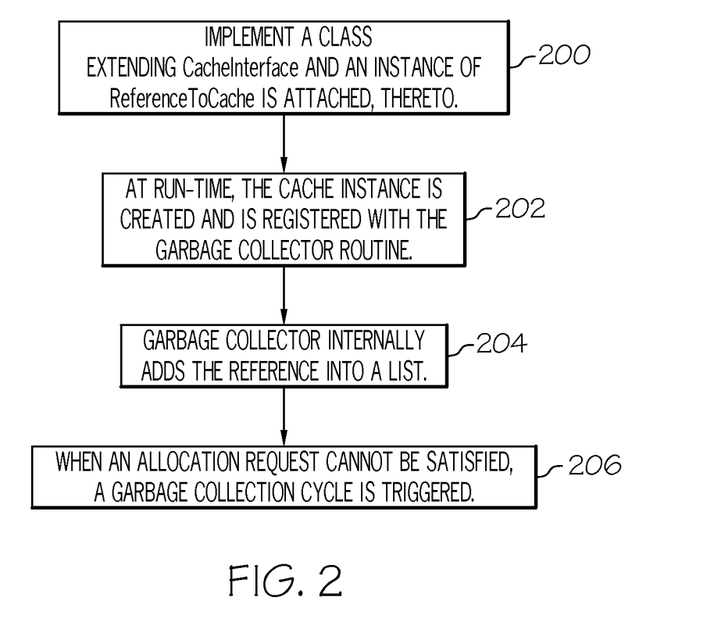
Figure 3:
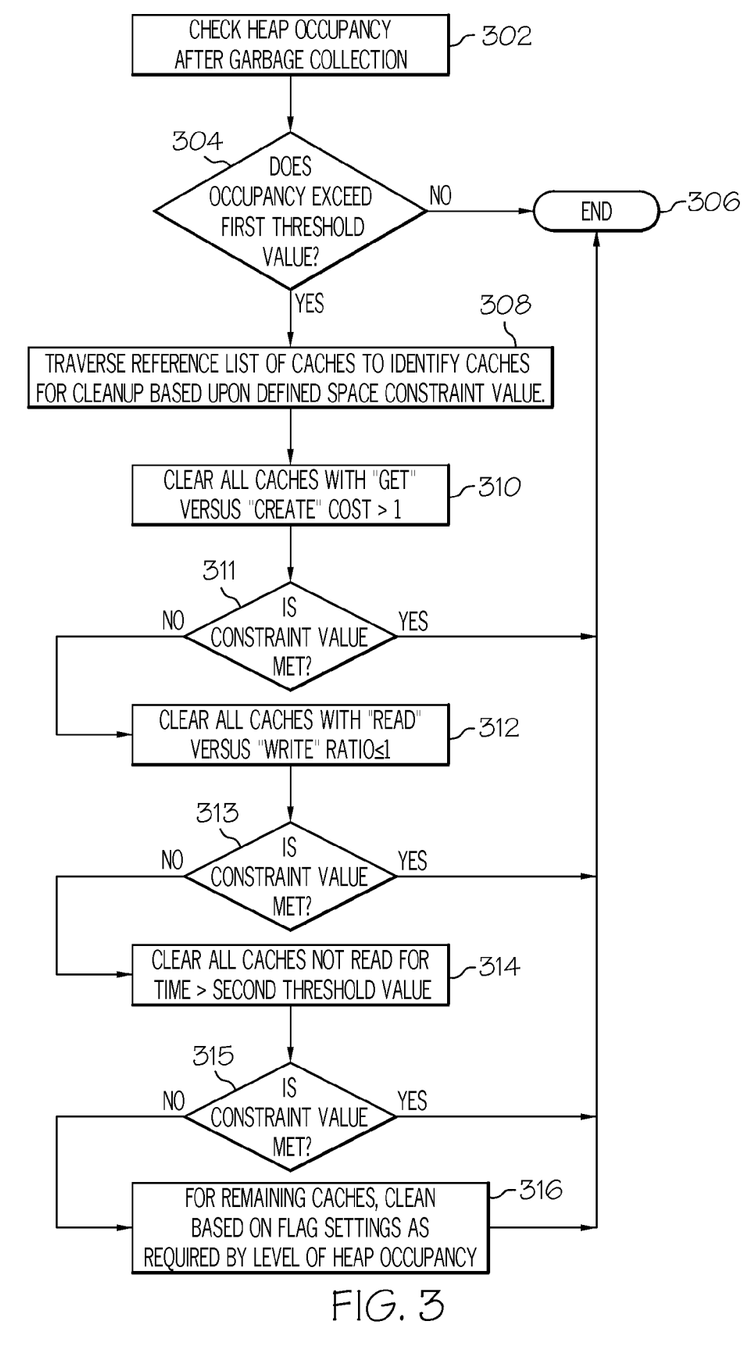

Referring to FIGS. 2 and 3, flowcharts illustrate one embodiment of the present invention in relation to the Socket connection cache sample implementation above. Referring first to FIG. 2, at block 200, a class (ConnectionCache) is implemented by extending CacheInterface and an instance of ReferenceToCache. At run-time, when the cache instance is created, it gets registered with the garbage collector routine at block 202. The garbage collector internally adds the reference into a list at block 204. At block 206 a standard garbage collection cycle is triggered whenever an allocation request cannot be satisfied.

Referring to FIG. 3, if the requested amount of memory could not be freed, even after a garbage collection cycle, the heap occupancy is computed (determined from the stored list in the GC) at block 302. At decision block 304 it is determined whether the heap occupancy of the caches as a ratio of overall heap occupancy by the application is greater than an acceptable first threshold value (heuristically determined or user-supplied). Heuristics computation involves execution of the program/implementation of the procedure several times in a loop using various different platforms, architectures and execution environments. It also requires execution of the method/procedure/program in question by passing various different user inputs and parameters. Further, the results from the program runs are then tabulated and analyzed before a suitable first 'threshold' value is recommended to end users. Implementing a user supplied first threshold value can be simply accomplished with a command line argument to the program when it is run.

If the heap occupancy of the caches exceeds this acceptable first threshold value, the runtime invokes the cache cleanup procedures for each of the individual cache implementations that have contributed significantly to the memory pressure. One embodiment of the present invention provides the GC component/JVM like runtime with the contribution of each of the software caches registered with it. This can then be compared against the overall memory occupancy by all the caches. This comparison and other calculations done at runtime (such as readVSwriteRatio, getVsCreateRatio, lastRead, lastWrite) can also help detect candidate caches that contribute significantly to the memory pressure and, therefore, can be cleaned. These parameters can also help prioritize the cleanup order of the remaining caches and invoke cleanup procedures on them. However, if the response to decision block 304 is no, the process ends at block 306, as the available memory is considered to be sufficient.

If the response to decision block 304 is yes, a sub-task of invoking the cleanup procedures of the caches that have contributed significantly (significance being previously defined above) to the memory pressure will be undertaken. As part of this sub-task, the reference list is first traversed at block 308 for cleanup based upon defined space constraint values. For example, a "mild" memory pressure exists, so, about 5% of total entries in the cache can be cleaned using, for example, a "least recently used" algorithm. As shown above, further space constraint values can be defined as "medium" at 10%, "severe" at 20%, and "critical" at 40%. Although not shown, it is to be understood that the values and percentages represented, thereby, can be set at the user's option.

At block 310, all caches with a "get" versus "create" cost having a value greater than 1, are cleared. A get versus create cost (in terms of total wall clock time taken for completion) that is greater than 1 indicates that it is faster to create the value than it is to "fetch" the value from the cache. Thus, implementations are better off without caching such values. It is then determined at decision block 311 whether the defined space constraint value has been met. If the response to decision block 311 is yes, the process ends at block 306.

If it is determined at decision block 311 that the space constraint value is not met, the process continues to block 312, wherein all caches whose read (number of times a value is fetched from the cache) vs. write (number of times a value is updated in the cache including its creation) ratio is less than or equal to 1 are also cleared. A ratio less than or equal to 1 indicates that the cached values are not being looked up frequently enough.

It is then determined at decision block 313 whether the defined space constraint value has been met. If the response to decision block 313 is yes, the process ends at block 306. If it is determined at decision block 313 that the space constraint value is not met, the process continues to block 314 wherein all the caches that have not been read within a pre-designated time (second threshold to be decided by the implementer) are cleared.

It is then determined at decision block 315 whether the defined space constraint value has been met. If the response to decision block 315 is yes, the process ends at block 306. If it is determined at decision block 315 that the space constraint value is not met, the process continues to block 316. At block 316, for all the remaining caches, the cleanup method is invoked using an appropriate flag based on the heap occupancy. The process then ends at block 306.

Enhancement using binary dump of heap contents:

A binary dump of heap contents is a facility that generates a dump of all the reachable objects that are on the Java heap; that is, those that are used by the Java application. It shows the objects that are using large amounts of memory on the Java heap. One embodiment of the present invention introduces an additional enhancement on the way memory analysis tools can work. The tool would only need to look for the CacheReference objects and by processing the references can determine how much of the memory is actually held under the caches.

For example, a tool, such as, "Memory Analysis Tool" (MAT), can use the CacheInterface list available with the garbage collector component of the JVM to "display" accurate details of the memory occupancy of the software caches. At present, MAT or any other memory analysis tool cannot identify a cache object from a dump and hence cannot readily provide detailed information about memory occupancy of caches instantiated during the application run. Therefore, the present invention can help identify a cache object from a binary/memory dump, and, thus, closer introspection of the cache object becomes possible.

Once the cache object is examined, more intricate details related to memory occupancy and its effectiveness can be displayed. For example, using the fields and methods previously described above, to retrieve the field values can be used to determine memory occupancy. Cache effectiveness can also be determined by using the same methods and fields. For example, getVsCreateRatio( ) helps determine if the number of "gets" far out-weigh the creates. If yes, then the cache is being used effectively and is needed. Similarly, if time returned by lastRead( ) is huge, then there aren't enough cache lookups happening during the application run. Thus, these values, when looked at in conjunction with occupancy or create cost, can help make intelligent decisions.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for optimizing use of heap memory, comprising: with a processor, extending a cache implementation with a base class; with said processor, attaching an instance of a utility class to said base class; registering said cache implementation to a garbage collector routine with said processor; storing said registration as a reference list in a memory; responsive to an unsatisfied cache allocation request, triggering a garbage collection cycle to check heap occupancy; responsive to exceeding a first threshold value, traversing said reference list to identify caches for cleanup based upon a defined space constraint value, wherein said space constraint value comprises a plurality of defined percentages of total caches to be cleaned; and clearing all said identified caches in compliance with a plurality of criteria and in accordance with said defined space constraint value.

2. The method of claim 1, wherein traversing said reference list to identify caches for cleanup comprises: clearing all caches with a get cost greater than a create cost.

3. The method of claim 2, wherein traversing said reference list to identify caches for cleanup comprises:
clearing all caches with a read time less than or equal to a write time.

4. The method of claim 3, wherein traversing said reference list to identify caches for cleanup comprises:
clearing all caches not read for a period of time greater than a pre-set second threshold value.

5. The method of claim 4, wherein traversing said reference list to identify caches for cleanup comprises:
clearing caches based on flag settings as required by level of heap occupancy.

6. The method of claim 1, wherein said first threshold value is user selected.

7. The method of claim 1, wherein said first threshold value is heuristically determined.

8. A system for optimizing use of heap memory, comprising: a processor; and memory connected to the processor, wherein the memory is encoded with instructions and wherein the instructions when executed comprise: instructions for extending a cache implementation with a base class; instructions for attaching an instance of a utility class to said base class; instructions for registering said cache implementation to a garbage collector routine; instructions for storing said registration as a reference list; responsive to an unsatisfied cache allocation request, instructions for triggering a garbage collection cycle to check heap occupancy; and responsive to exceeding a first threshold value, instructions for traversing said reference list to identify caches for cleanup based upon a defined space constraint value, wherein said space constraint value comprises a plurality of defined percentages of total caches to be cleaned; and instructions for cloning clearing all said identified caches in compliance with a plurality of criteria and in accordance with said defined space constraint value.

9. The method of claim 8, wherein traversing said reference list to identify caches for cleanup comprises: clearing all caches with a get cost greater than a create cost.

10. The system of claim 9, wherein said instructions for traversing said reference list to identify caches for cleanup based upon a defined space constraint value comprises:
instructions for clearing all caches with a read time less than or equal to a write time.

11. The system of claim 10, wherein said instructions for traversing said reference list to identify caches for cleanup based upon a defined space constraint value comprises:
instructions for clearing all caches not read for a period of time greater than a pre-set second threshold value.

12. The system of claim 11, wherein said instructions for traversing said reference list to identify caches for cleanup based upon a defined space constraint value comprises:
instructions for cleaning caches based on flag settings as required by level of heap occupancy.

13. A computer program product for optimizing use of heap memory, the computer program product comprising a non-transitory computer readable storage medium having computer readable program code embodied therewith, the computer readable program code comprising: computer readable program code configured to extend a cache implementation with a base class; computer readable program code configured to attach an instance of a utility class to said base class; computer readable program code configured to register said cache implementation to a garbage collector routine; computer readable program code configured to store said registration as a reference list; responsive to an unsatisfied cache allocation request, computer readable program code configured to trigger a garbage collection cycle to check heap occupancy; responsive to exceeding a first threshold value, computer readable program code configured to traverse said reference list to identify caches for cleanup based upon a defined space constraint value; and computer readable program code configured to clean said caches in accordance with said defined space constraint value, wherein said space constraint value comprises a plurality of defined percentages of total caches to be cleaned; and computer readable program code configured to clearing all said identified caches in compliance with a plurality of criteria and in accordance with said defined space constraint value.

14. The method of claim 13, wherein traversing said reference list to identify caches for cleanup comprises: clearing all caches with a get cost greater than a create cost.

15. The computer program product of claim 14, wherein said computer readable program code configured to traverse said reference list to identify caches for cleanup based upon a defined space constraint value comprises:
computer readable program code configured to clear all caches with a read time less than or equal to a write time.

16. The computer program product of claim 15, wherein said computer readable program code configured to traverse said reference list to identify caches for cleanup based upon a defined space constraint value comprises:
computer readable program code configured to clear all caches not read for a period of time greater than a pre-set second threshold value.

17. The computer program product of claim 16, wherein said computer readable program code configured to traverse said reference list to identify caches for cleanup based upon a defined space constraint value comprises:
computer readable program code configured to cleanup caches based on flag settings as required by level of heap occupancy.

* * * * *